R. KROEDEL.
CAMERA BACK.
APPLICATION FILED NOV. 4, 1915.
1,263,904.
Patented Apr. 23, 1918.
2 SHEETS—SHEET 1.
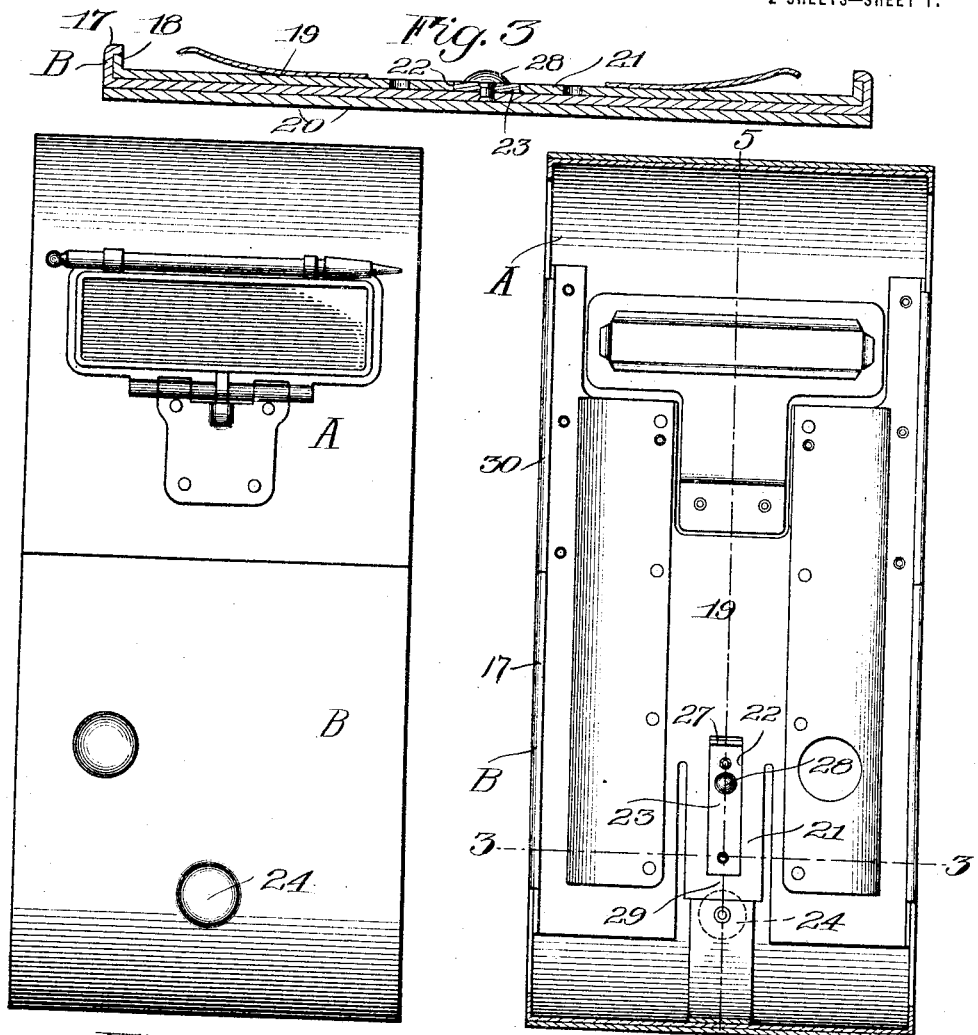
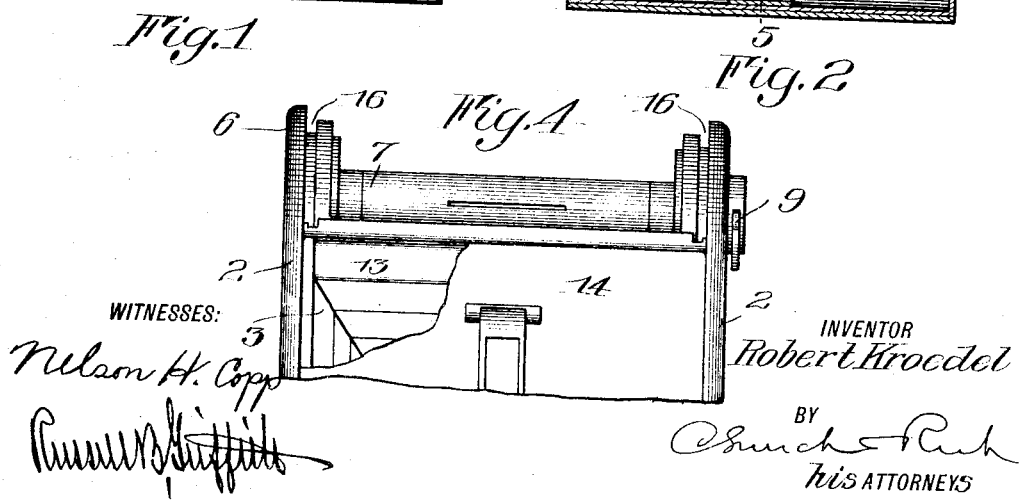
WITNESSES:
INVENTOR
Robert Kroedel
BY
his ATTORNEYS R. KROEDEL.
CAMERA BACK.
APPLICATION FILED NOV. 4, 1915.
1,263,904.
Patented Apr. 23, 1918.
2 SHEETS—SHEET 2.
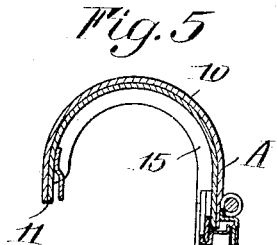
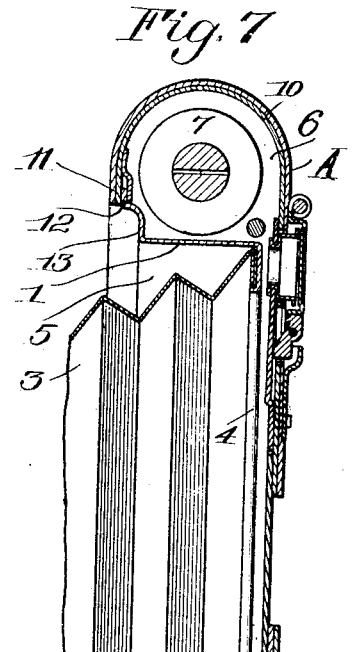
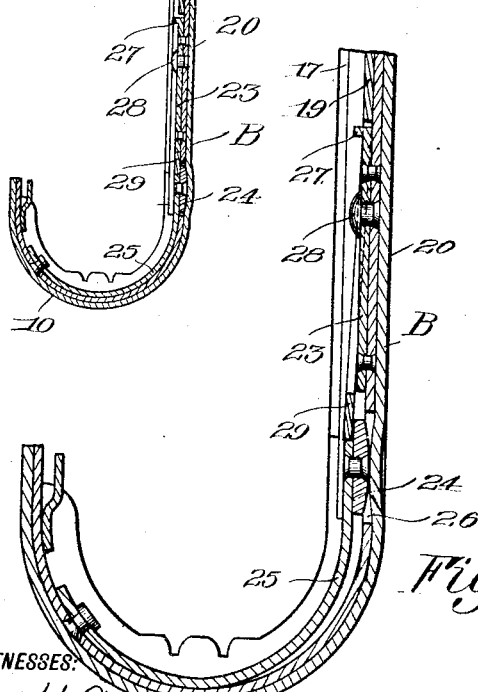
WITNESSES:
Nelson H. Opp
INVENTOR
Robert Kroedel
BY
his ATTORNEYS

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

CAMERA-BACK.

1,263,904.  Specification of Letters Patent.  Patented Apr. 23, 1918.

Application filed November 4, 1915. Serial No. 59,668.

*To all whom it may concern:*

Be it known that I, ROBERT KROEDEL, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras of the folding pocket type and it has for its object to simplify the construction of such cameras to render the interior parts more accessible and to promote convenience in the manipulation of the parts when it is required to remove the back as when the camera is loaded and unloaded. A further object of the invention is to provide a back for this type of camera that will offer greater security against the entrance of light at the joint between the back and body with particular reference to the protection of that portion of the film or sensitive material which is disposed in the focal plane. To these and other ends the invention resides in certain improvements and combinations of parts all as will be hereinafter more fully described, the novel features being pointed out in the claims at the end of the specification.

In the drawings:

Figure 1 is a rear elevation of a camera back constructed in accordance with and illustrating one embodiment of my invention;

Fig. 2 is a front elevation of the back with the end portions in vertical section;

Fig. 3 is an enlarged transverse section taken substantially on the line 3—3 of Fig. 2;

Fig. 4 is a fragmentary front elevation of one end of the camera body;

Fig. 5 is a vertical section of the back taken substantially on the line 5—5 of Fig. 2;

Fig. 6 is a fragmentary view showing an enlargement of the lower part of Fig. 5, and Fig. 7 is a view similar to Fig. 5 but showing the camera body also in the same sectional plane and the back itself adjusted to another position.

Similar reference numerals throughout the several figures indicate the same parts.

Referring first more particularly to Figs. 6 and 7, the camera body consists merely of the inner bellows frame 1 and the two end pieces 2 which latter are connected together solely by the said frame. The bellows 3 is connected to the rear of the bellows frame around the exposure opening 4 therein, as usual, and when collapsed occupies the chamber 5 within the frame.

The end pieces 2 project beyond the frame at both of their ends, as shown at 6, and carry the usual trunnions or supports for the film spools 7 and 8. One of said supports is shown in Fig. 4 in the form of the exteriorly arranged winding key 9. The film spools are housed in chambers of which the inner walls are constituted by the frame 1 and the end walls by the portions 6 of the end pieces 2 of the body. In the practice of my present invention, however, the front and back walls and the intermediate or outer side walls of both film chambers are provided by the camera back in the following manner:

The back is separable from the body and is made in two parts A and B which, though permanently connected, are relatively movable and slide or telescope one upon the other so that they have the contracted position shown in Fig. 5 but may be extended as shown in Fig. 7. The free end of each piece is provided with a preferably curved forwardly extending portion 10 that spans the adjacent film spool and its supports and terminates in a double lip 11. This lip coöperates at the front of the camera with a single lip 12 turned up from the front edge of the frame 1 adjacent to the seat 13 for the camera door 14 that is also formed in the frame and in this way a light-tight joint is made. Both parts of the back are provided with the usual edge flanges 15, Fig. 5, that lie in grooves 16, Fig. 4, of the ends pieces 2 of the body to prevent the entrance of light along the sides.

When the parts A and B are pushed together or contracted, as in Fig. 5, they embrace the camera body coöperating therewith at the front as just described in such manner that as long as they are locked together, they are locked to the body in light-tight manner and inclose both film spools. When they are extended or drawn apart, as shown in Fig. 7, one of the rounded or forwardly turned portions 10 becomes unhooked from the camera as will be seen and the range of relative movement is such that this portion will then clear the spool and the adjacent portions of the body so that it may be tilted rearwardly on the opposite lip 12 as a center until it reaches a position in which the other two lips 11 and 12 may be disengaged by an endwise movement and the back completely separated from the body, as will be understood. The application of the back to the body is the reverse of this operation, the collapsing of the two parts A and B causing both sets of lips to engage.

I prefer to connect the two parts A and B of the back in the following manner: The member B is provided with forwardly and inwardly turned flanges 17 forming guides for the reception of flanges 18 on a plate 19 secured to part A and overlapping part B (see Fig. 3). 20 is the leather covering for the exterior surfaces of the parts. The plate 19 is further provided with a spring tongue 21 having an opening 22 therein adapted to snap over and lock with a catch plate 23 on member B when the two parts of the back are in collapsed position as in Figs. 1, 2 and 5. At this time, the end of the spring tongue 21 rests upon a push button 24 (Fig. 6) normally held by a curved spring 25 in an aperture 26 in part B. When this button is pressed forwardly with the finger through the flexible leather covering 20, it raises the end of the tongue 21 from engagement with the plate 23 and allows the parts to be extended to the position shown in Fig. 7 until the portion 29 of the tongue at the end of the opening 22 engages a lip 27 at the opposite end of the plate 23 which engagement limits the relative sliding movement of the parts. In coming into engagement with the lip 27 the tongue rides over a rounded projection 28 on the plate 23 which temporarily prevents the parts from collapsing again unless strongly pressed together, the portion 29 of the tongue being retained between the lip 27 and such projection.

There is a flange 30 (Fig. 2) on the member A corresponding to flange 17 Fig. 3 on the member B and constituting a continuation of the latter when the parts are contracted but this is merely to provide a smooth joint and to further strengthen the attachment of the plate 19 which is rigidly secured beneath such flanges 30.

The back when in position is securely locked to the camera by the single catch 21—23 and it will be observed that the joint 11—12 is, in each instance, at the front of the camera and of the film chamber adjacent to protected portions of the film and not in the region of the unrolled portion in the focal plane of the camera. The back may be easily and quickly removed by pressing on the button 24 and at the same time pulling the part B in a longitudinal direction and when removed, both film chambers are completely uncovered making the film roll supports easily accessible for convenient manipulation of the rolls.

I claim as my invention:

1. In a camera, the combination with a camera body composed of end pieces and a bellows frame constituting the sole means connecting them together, said end pieces being arranged to project beyond the bellows frame at both ends and form the end walls of roll film chambers, of a separable back having portions constituting the front, back and intermediate walls of both film chambers.

2. In a camera, the combination with a body having an inner frame forming an intermediate bellows chamber and end walls extending beyond the latter to constitute end walls for two roll film chambers on opposite sides of the bellows chamber, of a separable back having portions constituting the front, back and intermediate walls of both film chambers and jointed to the said frame at the front of the camera.

3. In a camera, the combination with a body, of a separable back having forward extensions and constituting the front, back and intermediate walls of roll film chambers at opposite ends of the camera, said back being composed of two relatively movable parts having means permanently connecting them together.

4. In a camera, the combination with a body, of a separable back having forward extensions and constituting the front, back and intermediate walls of roll film chambers at opposite ends of the camera, said back being composed of two relatively movable parts having means detachably engaging the body.

5. In a camera, the combination with a body, of a separable back having forward extensions and constituting the front, back and intermediate walls of roll film chambers at opposite ends of the camera, said back being composed of two relatively movable parts having means detachably engaging the body and permanently connected together.

6. In a camera, the combination with a body, of a separable back having forward extensions and constituting the front, back and intermediate walls of roll film chambers at opposite ends of the camera, said back being composed of two relatively movable parts arranged to slide, one upon the other.

7. In a camera, the combination with a body having film roll chambers at opposite ends thereof, of a two-piece back having portions at both ends embracing the respective film roll chambers and movable upon each other to uncover said chambers.

8. In a camera, the combination with a body, of a two-piece back, the parts of which are respectively adapted to cover a film roll at each end of the body and to interlock with the latter by a sliding movement.

9. In a camera, the combination with a body, of a two-piece back, the parts of which are slidably connected to interlock with the body at the front thereof and inclose with the body film rolls at opposite ends of the latter.

10. In a camera, the combination with a body, of a member interlocking therewith at the front to inclose, in part, a film roll at one end of the body and slidably mounted on the rear of the body to move into and out of such interlocking engagement.

11. In a camera, the combination with a body, of members slidable in opposite directions parallel with the focal plane of the camera to engage and disengage with the ends of the body and constituting walls of film chambers at opposite ends of the latter.

12. In a camera, the combination with a body having film roll supports at opposite ends thereof, of a two-piece back the parts of which are flanged to slide telescopically upon each other and extended forwardly to interlock with the body at the front thereof and form walls of film chambers, and a catch for holding the parts coöperating with both parts when drawn together.

13. In a camera, the combination with a body having film roll supports at opposite ends thereof, of a two-piece back the parts of which are flanged to slide telescopically upon each other and extended forwardly to interlock with the body at the front thereof and form the front walls of film chambers, and a catch for holding the parts retracted, said catch being arranged on the inner side of the back and having means for operating it from the outer side.

ROBERT KROEDEL.

Witnesses:
EDITH WATERSTRAAT,
FRANK M. PAGE.

Copies of this patent may be obtained for five cents each, by addressing the "Commissioner of Patents, Washington, D. C."